United States Patent [19]

Bobard

[11] 4,164,985

[45] Aug. 21, 1979

[54] STRADDLING TRACTORS

[75] Inventor: Charles E. Bobard, Gigny, France

[73] Assignee: ETS. Bobard Jeune S.A., Beaune, France

[21] Appl. No.: 876,635

[22] Filed: Feb. 10, 1978

[30] Foreign Application Priority Data

Feb. 11, 1977 [FR] France .................................. 77 03873

[51] Int. Cl.² ............................................. B60D 1/00
[52] U.S. Cl. .................................. 180/53 D; 172/448; 180/53 C; 280/461 A; 180/900
[58] Field of Search ............ 280/490 R, 490 A, 479 R, 280/479 A, 461 A, 460 A, 497; 172/448, 483, 443, 439, 680; 180/1 F, 53 C, 9.5, 6.48

[56] References Cited

U.S. PATENT DOCUMENTS

| 2,745,503 | 5/1956 | Fisher | 180/9.5 |
| 3,690,395 | 9/1972 | Spiller et al. | 180/6.48 |
| 3,756,203 | 9/1973 | Dedoes | 280/490 A |
| 4,000,911 | 1/1977 | Weber | 280/490 R |
| 4,009,890 | 3/1977 | Kawakita | 280/456 A |
| 4,057,265 | 11/1977 | Grace | 280/490 R |

FOREIGN PATENT DOCUMENTS 585454  11/1958  Italy ......................................... 180/1 F Primary Examiner—John A. Pekar
Attorney, Agent, or Firm—Darby & Darby

[57] ABSTRACT

An implement hitching mechanism for a tractor of the type for straddling rows of agricultural crops in which a first gantry is connected to the tractor and a second gantry having the hitching means thereon is mounted to said first gantry for movement therealong.

30 Claims, 6 Drawing Figures

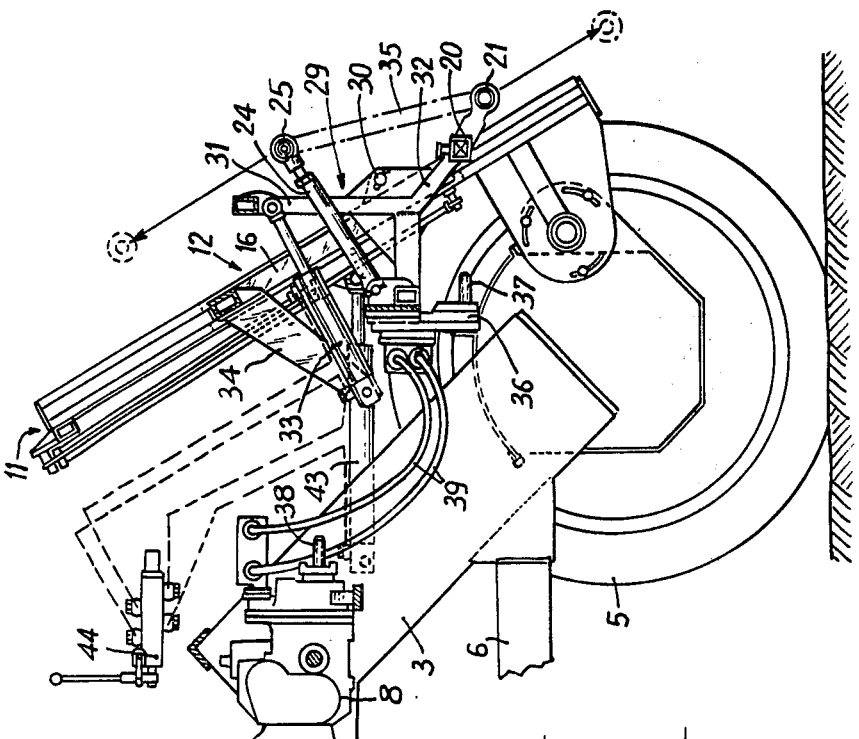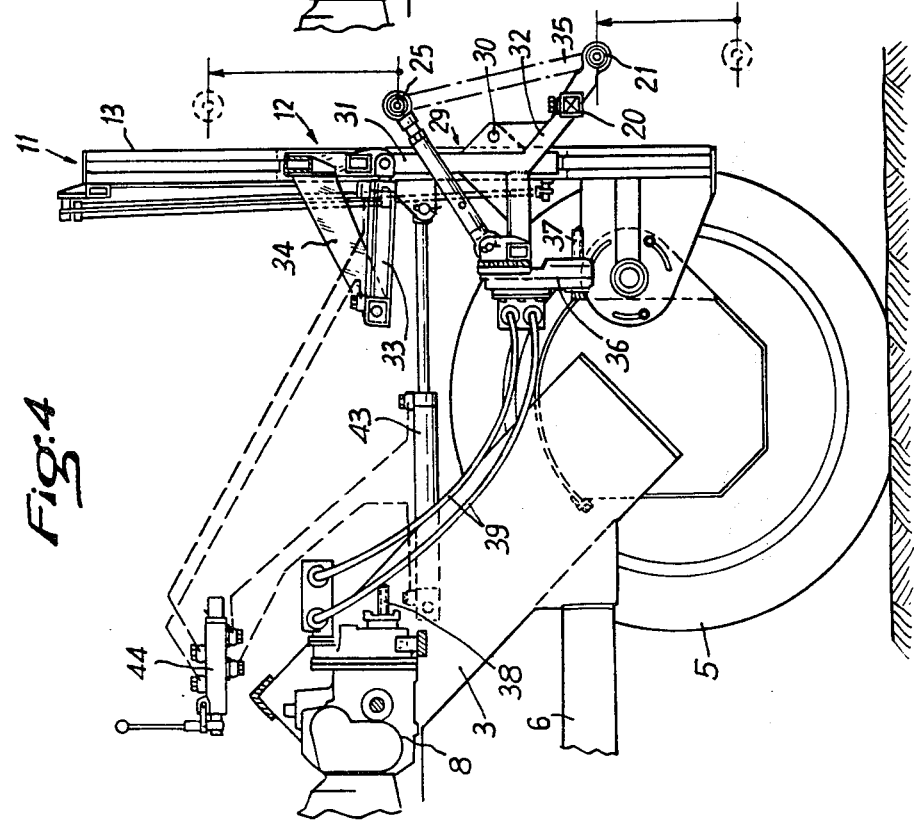

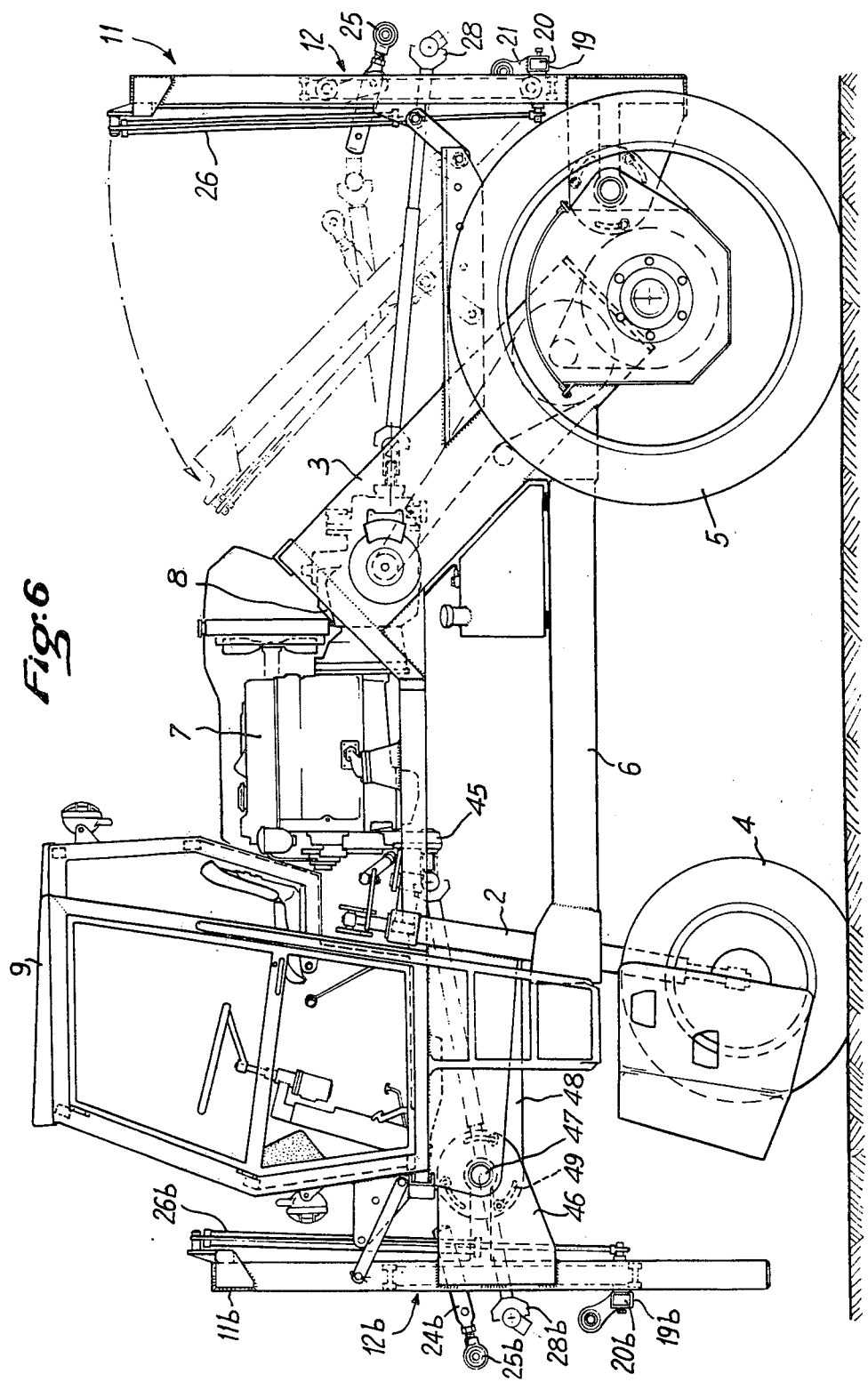

STRADDLING TRACTORS

The present invention relates to an improvement in straddling tractors, that is to say, tractors whose front and rear wheels are disposed at the end of legs so that they will be raised high enough to be able to straddle a row of vines.

The use of this kind of tractor, originally reserved exclusively to viniculture, tends to extend to other agricultural activities, in particular for the cultivation of corn and cereals, up to the time of their maturity, that is to say when the vegetation is at maximum height.

The use of these raised tractors now presents problems in the hitching of the cultivation implements to the raising means which are sometimes too high.

It is the object of the present invention to provide a solution to this type of problem, and it relates to a hitching device designed in such a way as to permit the hitching on the ground of the equipment ordinarily used in agriculture.

Figure 1:
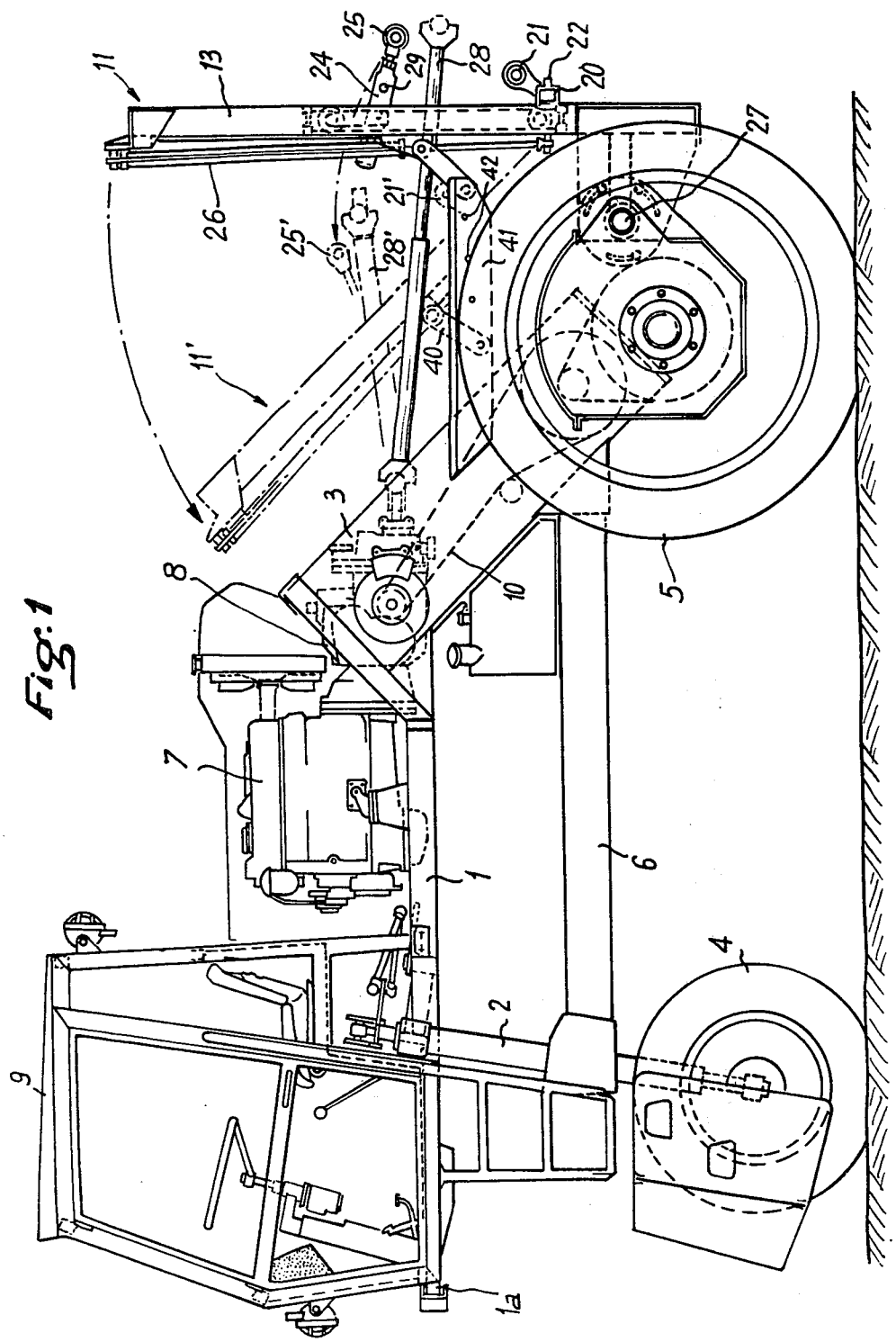
Figure 2:
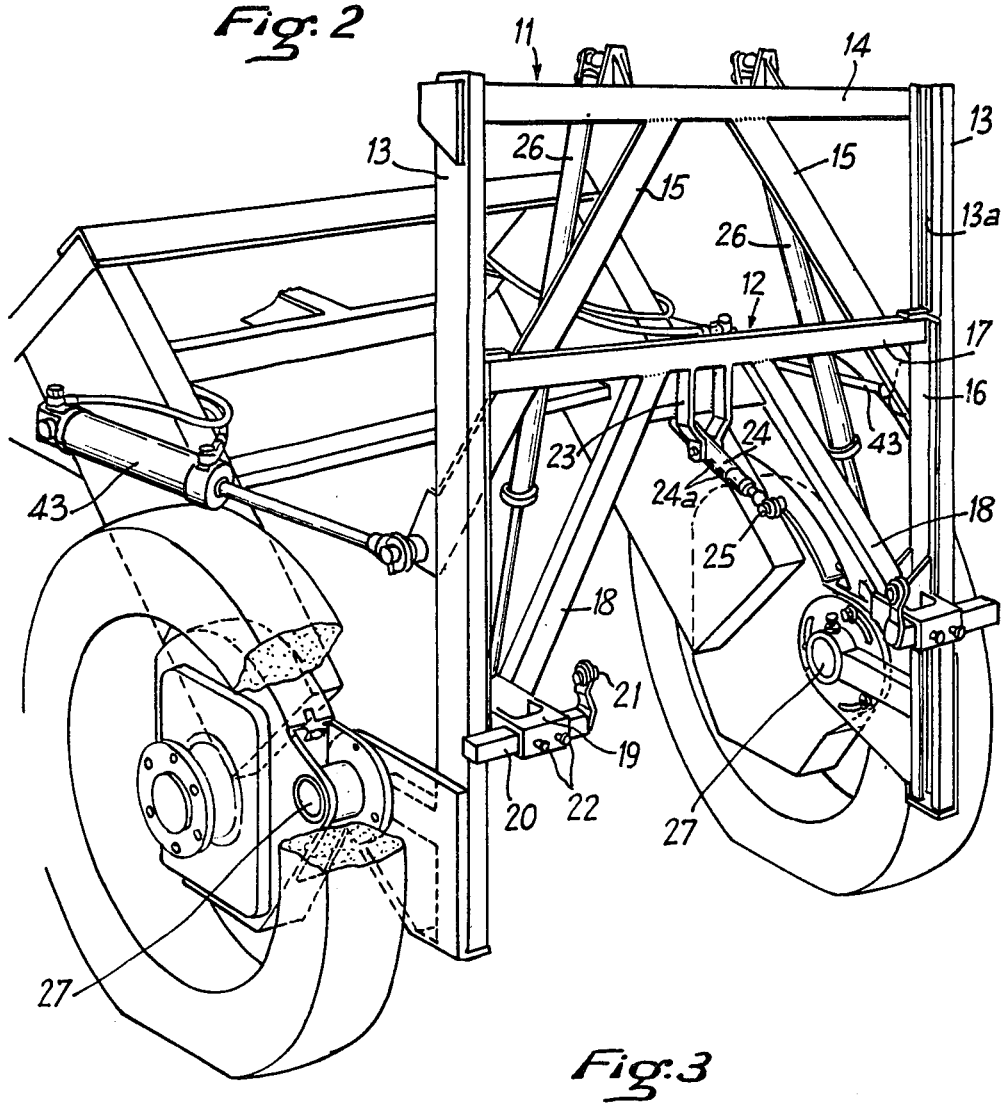
Figure 3:
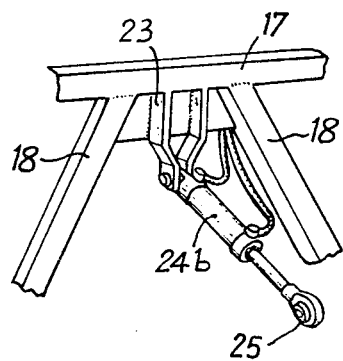

By way of example, and to facilitate comprehension of the invention, there is represented, in the attached drawings:

In FIG. 1, a side elevation in partial section of a first embodiment of a tractor according to the invention;

In FIG. 2, a partial, three-quarter rear view in perspective, of the tractor of FIG. 1;

In FIG. 3, a detail view of an alternative of FIG. 3;

In FIG. 4, a partial side view, in section, of a second embodiment;

In FIG. 5, a view corresponding to FIG. 4;

In FIG. 6, a side elevation in partial section, of an alternative embodiment of the tractor of FIG. 1.

Referring to these figures, and more particularly to FIG. 1, we note that the chassis of the tractor has a platform 1, borne by front legs 2 and rear legs 3 equipped with front wheels 4 and rear wheels 5. Preferably, the legs 2 and 3 on the same side, are connected together by a reinforcing brace 6.

The drive assembly, that is to say motor 7 and gearbox 8, are located on the platform 1 in such a way that the center of gravity of this assembly will be substantially in the center of the suspension polygon defined by the four wheels.

It is quite clear that if there is mounted on platform 1, the usual hitching links of tractors, it will not be possible to hitch thereto, implements which are on the ground. It is necessary either to have a lifting means available, or to first put the implement to be hitched onto a trestle having approximately the height of platform 1.

In French Pat. No. 2,337,985 in the name of the applicant, there is a proposal for a solution which includes disposing the articulation of the lifting links in practically the median plane of the tractor, giving them sufficient length and disposing the power takeoff in this same median plane. This solution is satisfactory, but exhibits several drawbacks, in particular with regard to the rigidity of these hitching links, which are quite long.

According to the invention, the straddling tractor has, at the rear, a gantry 11, along which a second gantry 12 can slide, the latter bearing means of attachment of a conventional 3-point hitch. Preferably, and as represented in FIG. 2, the first gantry 11 is an inverted U-shaped frame with two vertical side uprights 13 connected by an upper cross-piece 14, the assembly being reinforced by stays 15. Inside the lateral uprights 13 there are rails 13a. The lateral uprights can, for this purpose, be formed by U-profiles forming rails.

Inside the rails 13a, there slides the second gantry 12, which is likewise formed by a frame with two lateral uprights 16 connected by an upper crosspiece 17 and reinforced by stays 18. Each upright 16 has, at its base, a cap 19 in which there is placed a sliding piece 20 bearing a hitching journal 21. Preferably, each sliding piece 20 can slide in cap 19, and can be fixed in any desired position by a clamping means 22.

The upper crosspiece 17 has in its center, a stirrup 23, bearing the upper hitching link 24 and its journal 25. The sliding movement of gantry 12 in gantry 11 can be obtained by any known mechanical means. In the example represented, it is obtained by means of two symmetrical jacks 26, fixed on the one hand to gantry 11 and on the other hand to gantry 12. It is seen, then, that by means of jacks 26, gantry 12 can be lowered to the level of the hitching axes of the implement which is on the ground, so that it will be possible to place these axes in the two lower journals 21 and in the upper journal 25. After this the gantry 12 is raised by jacks 26, which raises the implement and brings it to the desired height.

This two-gantry lifting system can be disposed on any type of tractor, but in the event it is disposed on a tractor such as the one described in FIG. 1, it is particularly advantageous to articulate gantry 11 on the rear legs 3 about aligned horizontal axes 27. This, as a matter of fact, makes it possible to tilt gantry 11 forward, bringing the center of gravity of the tool closer to the center of gravity of the tractor.

In FIG. 1, the tilted position 11' of the gantry is illustrated diagrammatically in dotted lines, as well as position 21' and 25' of the hitching journals. This is extremely advantageous for improving the equilibrium and the stability of the tractor-implement assembly. The tilting of gantry 11 can be obtained either by means of stays 40 fixed in several positions on horizontal arms 41 by means of a plurality of holes 42, as in FIG. 1 or by means of one or more hydraulic jacks 43, as in FIG. 2. In the latter case the intermediate shaft 28 or power takeoff jack shaft must be telescopic, which is already known.

When the gantry 12 is to be tilted, it is usually necessary to have means allowing the implement to be in a horizontal position. For this purpose, as shown in FIG. 2, there is disposed on link 24, a plurality of holes 24a, by means of which the said link 24 is fixed to stirrup 23. In more advantageous fashion, link 24 can be replaced with a jack 24b, FIG. 3, whose shaft, at its end, bears journal 25. This permits control of the attitude of the tool from the driver's seat of the tractor.

FIGS. 4 and 5 represent an alternative embodiment in which the same elements bear the same reference numbers. Referring to this figure it is seen that gantry 12 includes a triangular armature 29, pivotally connected to said gantry 12 about a horizontal axis 30. This triangular armature has a vertical arm 31 and two lower arms 32. Each of the arms 32 bears a cap 19, which, as described above, bears sliding piece 20, journal 21 and clamping means 22. The upper link 24, bearing journal 25, is pivotally connected to armature 29. Vertical arm 31 is pivotally connected to the end of the shaft of a jack 33 which is borne by a support 34 connected to gantry 11.

Thus, when gantry 11 is tilted by means of jacks 43 into the position represented in FIG. 5, armature 29 can pivot around axis 30, by means of jack 33 in such a way that the implement, represented diagrammatically by the two dashed lines 35, remains parallel to itself.

According to another alternative embodiment, armature 29 can also serve as a support for a hydraulic, electric or pneumatic motor 36, driving a fluted shaft 37 analogous to the power takeoff shaft 38, the hydraulic motor in the example represented being fed by hoses 39.

The various jacks are controlled by a control device 44.

It is also possible that the reactions of the implements hitched to link 24 will be, as on a conventional farm tractor, utilized to act on the height of sliding frame 12 by means of jacks 26.

FIG. 6 represents an alternative embodiment of the tractor of FIG. 1. According to this alternative, the tractor has, in the front, a lifting device identical to the one in the rear. This rear lifting device is formed by a gantry 11b (identical to gantry 11) in which there slides a second gantry 12b (identical to gantry 12). Gantry 12b bears two caps 19b in which is placed a sliding piece 20b bearing a hitching journal 21b, as well as a stirrup 23b bearing an upper hitching link 24b and journal 25b. The movement of gantry 12b relative to gantry 11b is produced by jacks 26b. A power takeoff jack shaft 28b is also provided, this shaft being driven by a supplementary gearbox 45 located in front of motor 7.

Gantry 11b is carried by two lateral tabs 46, mounted rotatably on an axis 47, borne by one or more brackets 48. Circular slots 49 permit the adjustment of the inclination of gantry 11b.

What is claimed is:

1. Apparatus for hitching implements to a stilt-type tractor having a body of a generally inverted U shape to permit crops to pass thereunder comprising:
    first gantry means formed with an open bottom portion, means for attaching said first gantry means to said tractor,
    second gantry means formed with an open bottom portion,
    three point hitching means, means for mounting said hitching means to said second gantry means, and
    means for mounting said second gantry means to said first gantry means to provide relative movement between said two gantry means along at least a part of the lengths thereof.

2. Apparatus as in claim 1 wherein said second gantry mounting means comprises means for sliding said second gantry relative to said first gantry means.

3. Apparatus as in claim 1 wherein said first gantry means comprises an inverted, generally U-shaped frame.

4. Apparatus as in claim 1 wherein said second gantry means comprises an inverted, generally U-shaped frame.

5. Apparatus as in claim 4 wherein a respective first implement hitching means of said three point hitching means is carried on each of the vertical uprights of the U-shaped frame of said second gantry means.

6. Apparatus as in claim 5 wherein each said first implement hitching means comprises a cap, and a piece slidable in said cap carrying hitching journal means.

7. Apparatus as in claim 5 wherein a second implement hitching means of said three-point hitching means is carried on the cross-piece of the U-shaped frame of said second gantry means.

8. Apparatus as in claim 7 wherein said second implement hitching means comprises a stirrup attached to said cross-piece, and a hitching link mounted in said stirrup.

9. Apparatus as in claim 8 wherein said means for mounting said first gantry means to said tractor further comprises means for tilting said first gantry means relative to said tractor thereby carrying said second gantry means therewith.

10. Apparatus as in claim 9 further comprising means for fixing the hitching link of said second implement hitching means in a selected generally horizontal position when said first gantry means is tilted.

11. Apparatus as in claim 10 wherein said means for fixing the position of said hitching link of said second implement hitching means comprises jack means.

12. Apparatus as in claim 8 wherein said hitching link mounted in the stirrup of said second implement hitching means comprises a jack means.

13. Apparatus as in claim 1 wherein said means for mounting said first gantry means to said tractor further comprises first means for tilting said first gantry means relative to said tractor thereby carrying said second gantry means therewith.

14. Apparatus as in claim 13 wherein said first tilting means for said first gantry includes stay means connected to a point on the tractor.

15. Apparatus as in claim 14 wherein said stay means are fixed.

16. Apparatus as in claim 14 wherein said stay means are adjustable.

17. Apparatus as in claim 13 wherein said first tilting means comprises a jack.

18. Apparatus as in claim 13 further comprising means for tilting said hitching means relative to said second gantry means.

19. Apparatus as in claim 18 further comprising power takeoff means carried by said first gantry means.

20. Apparatus as in claim 19 further comprising means for controlling both said second gantry mounting means and said means for mounting said three point hitching means to said second gantry means.

21. Apparatus as in claim 13 further comprising second means for tilting said hitching means relative to said second gantry means.

22. Apparatus as in claim 21 wherein each of said first and second tilting means comprises jack means.

23. Apparatus as in claim 13 further comprising power takeoff means carried by said first gantry means.

24. Apparatus as in claim 1 further comprising means for tilting the hitching means carried by second gantry means relative to said second gantry means.

25. Apparatus as in claim 24 wherein said means for tilting, said hitching means comprises jack means connected between said second gantry means and said hitching means.

26. The combination of a tractor of the straddling leg type and a hitching implement apparatus, said hitching implement apparatus comprising:
    first gantry means, means for mounting said first gantry means to said tractor,
    means for tilting said first gantry means relative to the tractor,
    second gantry means,
    hitching means, means for mounting said hitching means to said second gantry means, and
    means for mounting said second gantry means to said first gantry means to provide relative movement between said two gantry means along at least a part of the lengths thereof.

27. The combination of claim 26 further comprising a respective said hitching implement apparatus mounted on the front and the rear of said tractor.

28. The combination as in claim 26 wherein said tilting means comprises a shaft on one of said tractor and said first gantry means, and a pair of supports on the other of said tractor and first gantry means with said supports being rotatable relative to said shaft.

29. The combination of claim 28 wherein said tractor has front and rear legs, the rear legs of the tractor being inclined forward by an angle of about 45°, said tractor further comprising a drive means and a cab for the driver on said tractor, the cab being located forward of the drive means to increase the area for the tilting of said first gantry means.

30. The combination of claim 26 wherein said tractor has front and rear legs, the rear legs of the tractor being inclined forward by an angle of about 45°, said tractor further comprising a drive means and a cab for the driver on said tractor, the cab being located forward of the drive means to increase the area for the tilting of said first gantry means.

* * * * *